US012647005B2

(12) United States Patent
Bertolucci

(10) Patent No.: US 12,647,005 B2
(45) Date of Patent: Jun. 2, 2026

(54) FRICTION WELDED STATOR CARRIER

(71) Applicant: Schaeffler Technologies AG & Co. KG, Herzogenaurach (DE)

(72) Inventor: Helder Bertolucci, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 220 days.

(21) Appl. No.: 18/408,771

(22) Filed: Jan. 10, 2024

(65) Prior Publication Data

US 2025/0226733 A1     Jul. 10, 2025

(51) Int. Cl.
   *H02K 15/02*      (2025.01)
   *H02K 5/04*      (2006.01)

(52) U.S. Cl.
   CPC ............... *H02K 15/02* (2013.01); *H02K 5/04* (2013.01); *H02K 2213/03* (2013.01); *H02K 2215/00* (2021.08)

(58) Field of Classification Search
   CPC ........ H02K 5/04; H02K 15/02; H02K 15/123; H02K 15/125; H02K 15/13; H02K 15/14; H02K 15/142
   See application file for complete search history.

(56) References Cited

U.S. PATENT DOCUMENTS

| | | | | |
|---|---|---|---|---|
| 4,028,568 | A | * | 6/1977 | Tatsumi .................... H02K 5/00 |
| | | | | 310/410 |
| 10,065,363 | B2 | * | 9/2018 | Schiccheri ........... B23K 26/206 |
| 2019/0273414 | A1 | * | 9/2019 | Cheung .................... H02K 5/15 |
| 2020/0303985 | A1 | * | 9/2020 | Durand .................... H02K 9/00 |

FOREIGN PATENT DOCUMENTS

| | | | | |
|---|---|---|---|---|
| DE | 102016215187 | A1 | * | 2/2018 | ............. H02K 5/203 |
| WO | WO-9514325 | A1 | * | 5/1995 | ............... H02K 5/04 |

OTHER PUBLICATIONS

18408771_Sep. 19, 2025_DE_102016215187_A1_H.pdf (Year: 2025).*
18408771_Sep. 19, 2025_WO_9514325_A1_H.pdf (Year: 2025).*

* cited by examiner

*Primary Examiner* — Maged M Almawri
*Assistant Examiner* — Ahmed F Seck
(74) *Attorney, Agent, or Firm* — Volpe Koenig

(57) ABSTRACT

A method of making a stator carrier for an electric motor includes forming a first end component, forming a second end component, forming an intermediate component, and joining axial end faces of the first and second end components to respective opposite axial end faces of the intermediate component. Joining the axial end faces is done by friction or laser welding to form welds or weld regions between the components.

13 Claims, 4 Drawing Sheets

50

FRICTION WELDED STATOR CARRIER

TECHNICAL FIELD

The present disclosure relates generally to electric motors, and more specifically to stator carriers of electric motors for motor vehicles.

BACKGROUND

In general, stator carriers are known structures of an electric motor. A typical stator carrier is a cylindrical body made of cast aluminum or another cast metal. A stator carrier is configured to house the stator components and rotor of the electric motor.

Conventional cast stator carriers are subject to porosity issues which can cause product failure. In general, the molds and equipment used for making the casting are not adaptable to other projects. Further, machining of the cast stator carriers increases final product cost and cannot be done internally because if porosity issues are found during machining, the casting must be discarded. Therefore, conventional cast stator carriers have limited design flexibilities.

SUMMARY

In accordance with one aspect of the present disclosure, a method of making a stator carrier for an electric motor comprises forming a first end component, forming a second end component, forming an intermediate component, and joining axial end faces of the first and second end components to respective opposite axial end faces of the intermediate component.

Joining the axial end faces of the first and second end components to respective opposite axial end faces of the intermediate component includes joining with welding process. The welding process can include at least one of friction welding or laser welding. At least one of the first or second end components can be formed in a stamping process. The second end component and the intermediate component can be tubular, and the axial end face of the first and second end components and the opposite axial end faces of the intermediate component can have a common circumference. A wall thickness of at least one of the first end component or the second end component can be less than 12 mm. The intermediate component can be formed in a stamping process. Forming the intermediate component can include machining the intermediate component from a tubular blank. Joining axial end faces of the first and second end components to respective opposite axial end faces of the intermediate component can be carried out simultaneously. The method can include machining an interior or exterior of the stator carrier after joining the axial end faces of the first and second end components to respective opposite axial end faces of the intermediate component. The second end component and the intermediate component can be made of aluminum or an alloy of aluminum.

In accordance with another aspect of the present disclosure, stator carrier comprises a first end component, a second end component, and an intermediate component between the first end component and the second end component. The first end component is a stamped component including a first axial end face, the second end component is a stamped component including a second axial end face, and the first end component and the second end portion are joined to opposite axial ends of the intermediate portion by welds.

The welds can be friction welds or laser welds. The first end component can have a cylindrical section including the first axial end face of the first end component, a frustoconical section extending from the cylindrical section, and a second axial end face extending from the frustoconical section, wherein the second axial end face of the first end component has a larger radial extent than the first axial end face of the first end component. The intermediate portion can be cylindrical.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION

Figure 1:
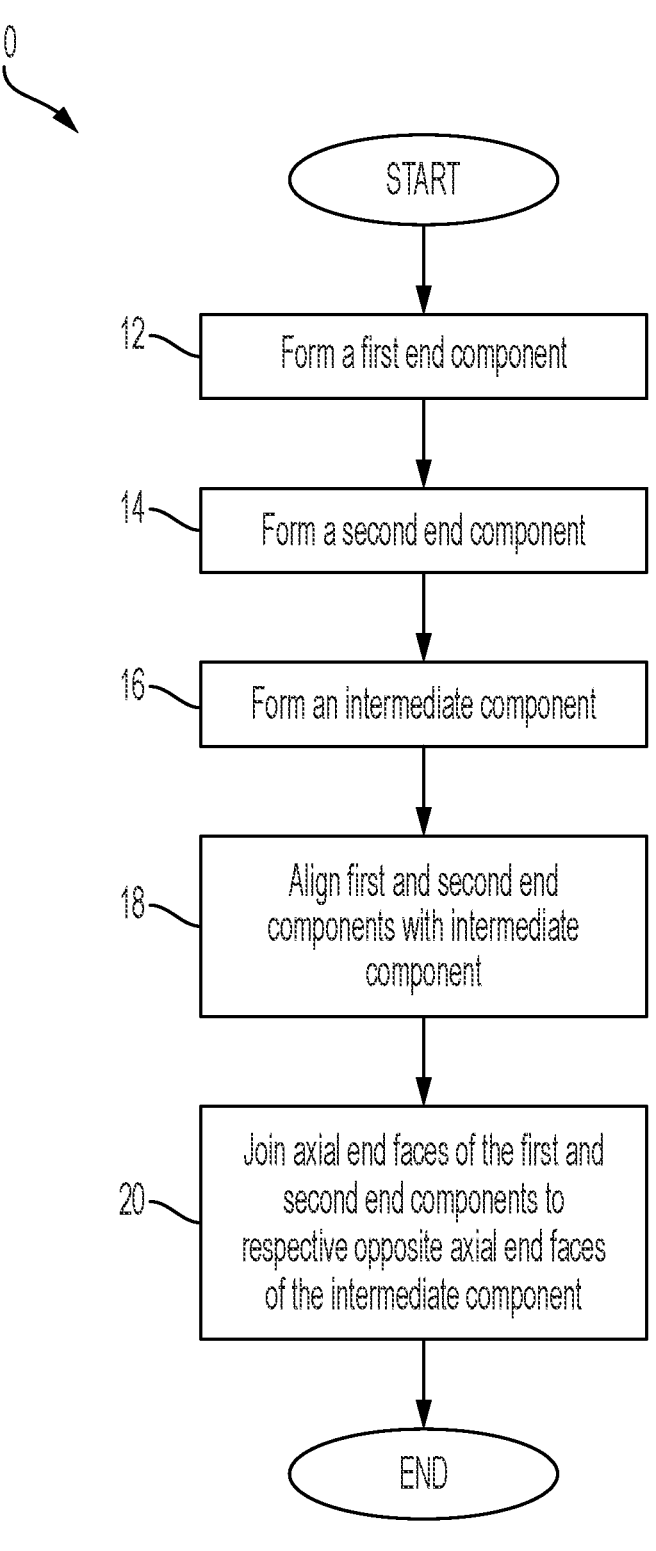
FIG. 1 is a flow diagram illustrating a method of making a stator carrier in accordance with the present disclosure.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Embodiments according to this disclosure provide a stator carrier comprising one or more stamped components welded together. The stamped components can be relatively inexpensive changed/modified and the tooling and equipment can be used for other purposes.

Referring to FIG. 1, an exemplary method of making a stator carrier in accordance with the present disclosure is illustrated and identified by reference numeral 10. The method 10 will be described in conjunction with FIGS. 2-4, which illustrate an exemplary stator carrier 50 at various stages of construction.

The method 10 begins with process step 12 wherein a first end component is formed. In process steps 14 and 16, a second end component and an intermediate component are formed. It will be appreciated that process steps 12, 14 and 16 can be performed in any order or simultaneously.

Figure 2:
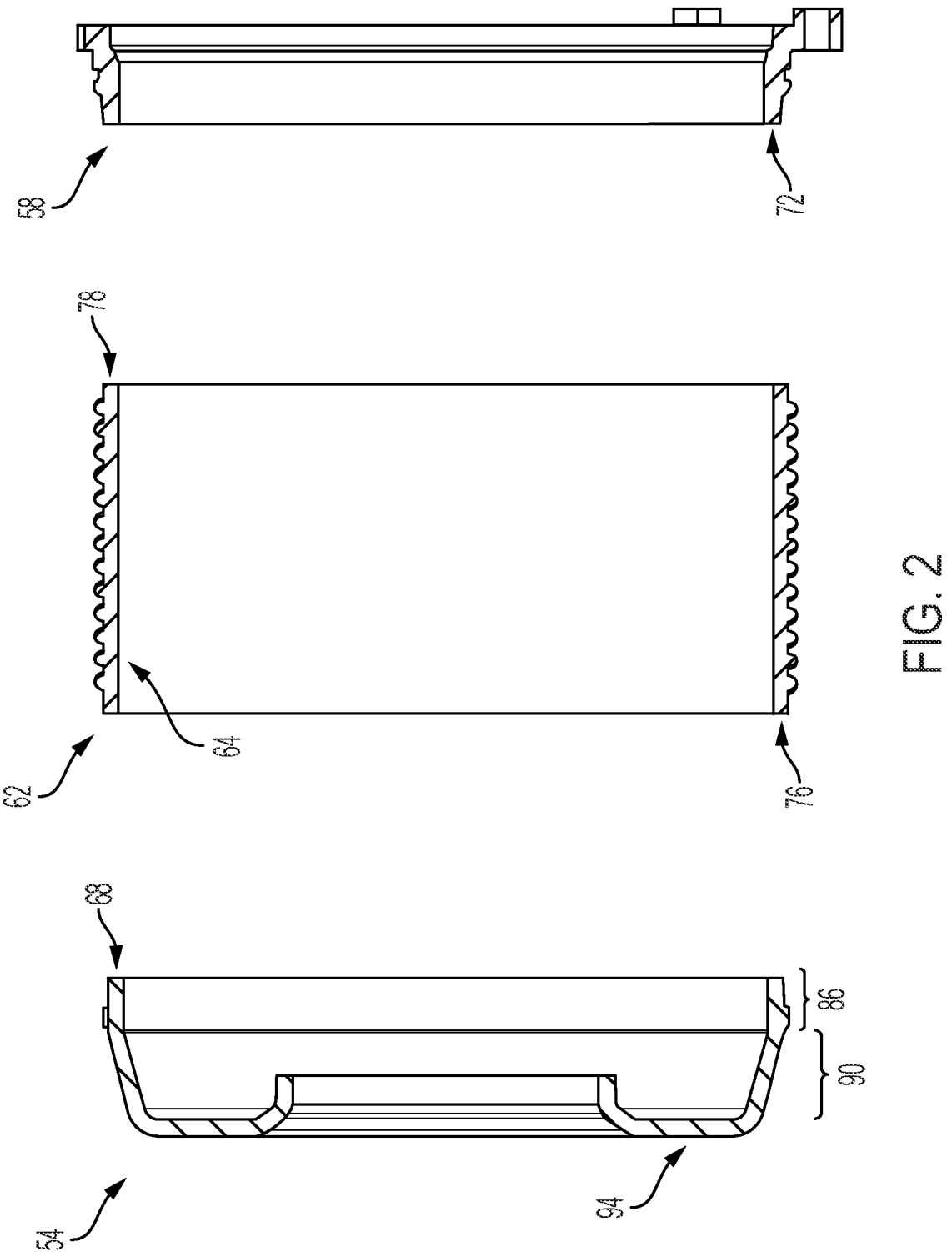
FIG. 2 is an exploded cross-sectional view of components of an exemplary stator carrier in accordance with the present disclosure.
Figure 3:
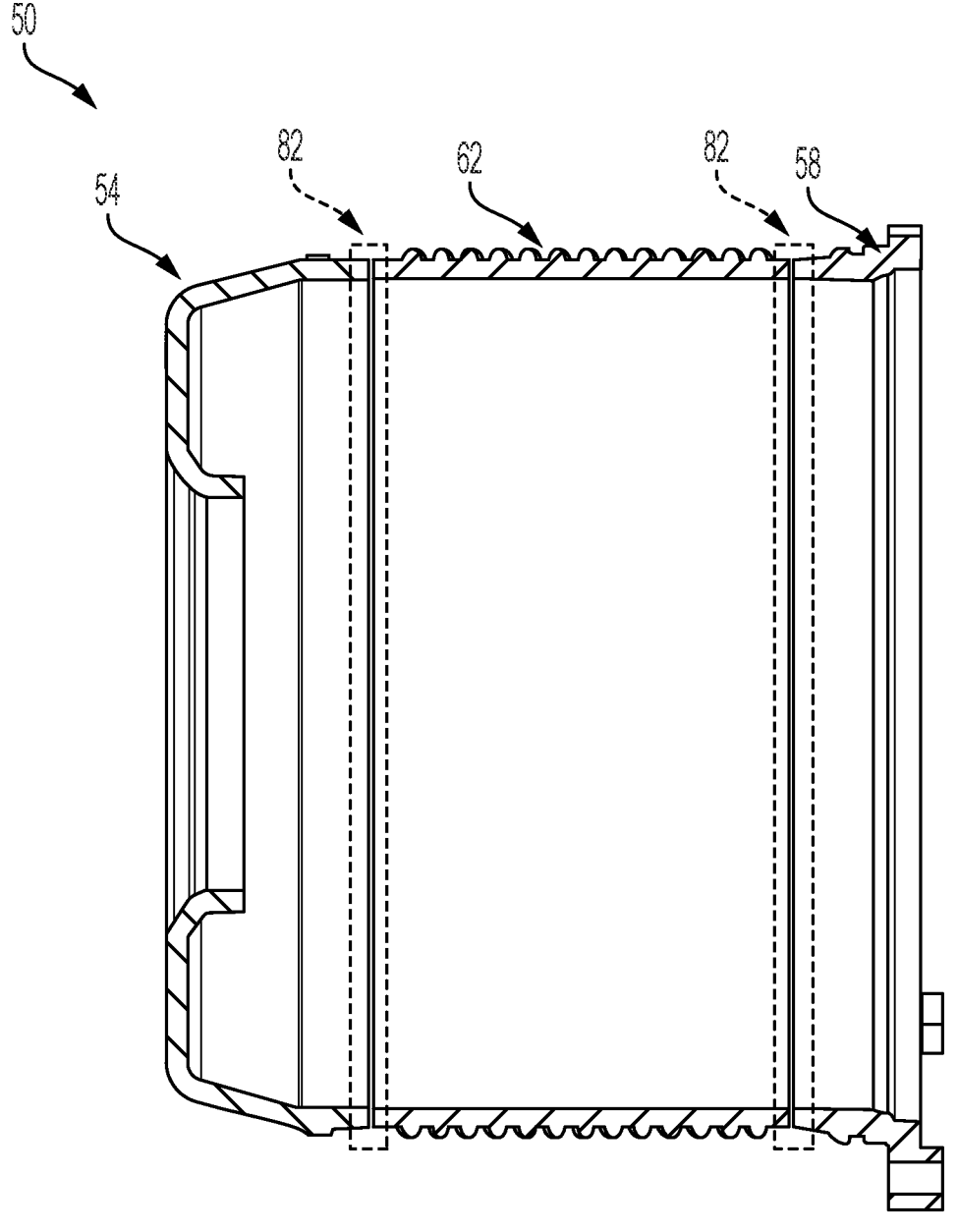
FIG. 3 is a cross-sectional view of an exemplary stator carrier in accordance with the present disclosure.

In FIG. 2, the first end component 54, second end component 58, and intermediate component 62 are illustrated after formation in process steps 12, 14 and 16 and prior to being joined together. It will be appreciated that at least one of the first or second end components 54 or 58 is formed in a stamping process with a wall thickness of approximately 12 mm, for example. The intermediate component 62 can be formed by any suitable process, such as stamping, machining, etc. In the illustrated example, the intermediate component 62 is comprised of a single tubular body 64. In other examples, the intermediate component 62 can include multiple tubular bodies.

The first and second end components 54 and 58 are generally cylindrical and include axial end faces 68 and 72, respectively. The intermediate component 62 is also generally cylindrical and includes opposite axial end faces 76 and 78. A circumference of each of the axial end faces 68, 72, 76 and 78 in the illustrated embodiment is the same, although this is not required. However, in general, axial end faces to be joined together will share a common circumference.

Returning to FIG. 1, in process step 18 the first, second and intermediate components 54, 58 and 62 are aligned, and in process step 20, the first, second and intermediate components 54, 58, and 62 are joined together to form the stator carrier 50.

Joining of the first, second and intermediate components 54, 58, and 62 in process step 20 can include laser welding or friction welding of the components. Depending on the process employed, the components may be joined together simultaneously or in pairs. Joining is typically performed by aligning axial end faces of adjacent components and then laser or friction welding the components to form welds or welded regions therebetween. For example, in FIG. 4, the stator carrier 50 is shown after process step 20 and the formation of welds or weld regions 82 between the intermediate component 62 and the first and second end components 54 and 58. Axial end faces 68 and 72 of the first and second end components 54 and 58 are joined to opposite axial end faces 76 and 78 of the intermediate component 62.

Regarding the weld or weld regions 82, it will be appreciated that the size and characteristics of the weld or weld region 82 will vary in part depending on the type of weld or weld region 82. For example, a friction weld or weld region 82 may have a relatively short axial length and generally will have a strength that it greater than the parent material from which the friction weld or weld region 82 is generated. A laser weld or weld region 82 may have a relatively longer axial length and generally will be more brittle than the parent material from which the laser weld or weld region 82 is generated.

Figure 4:
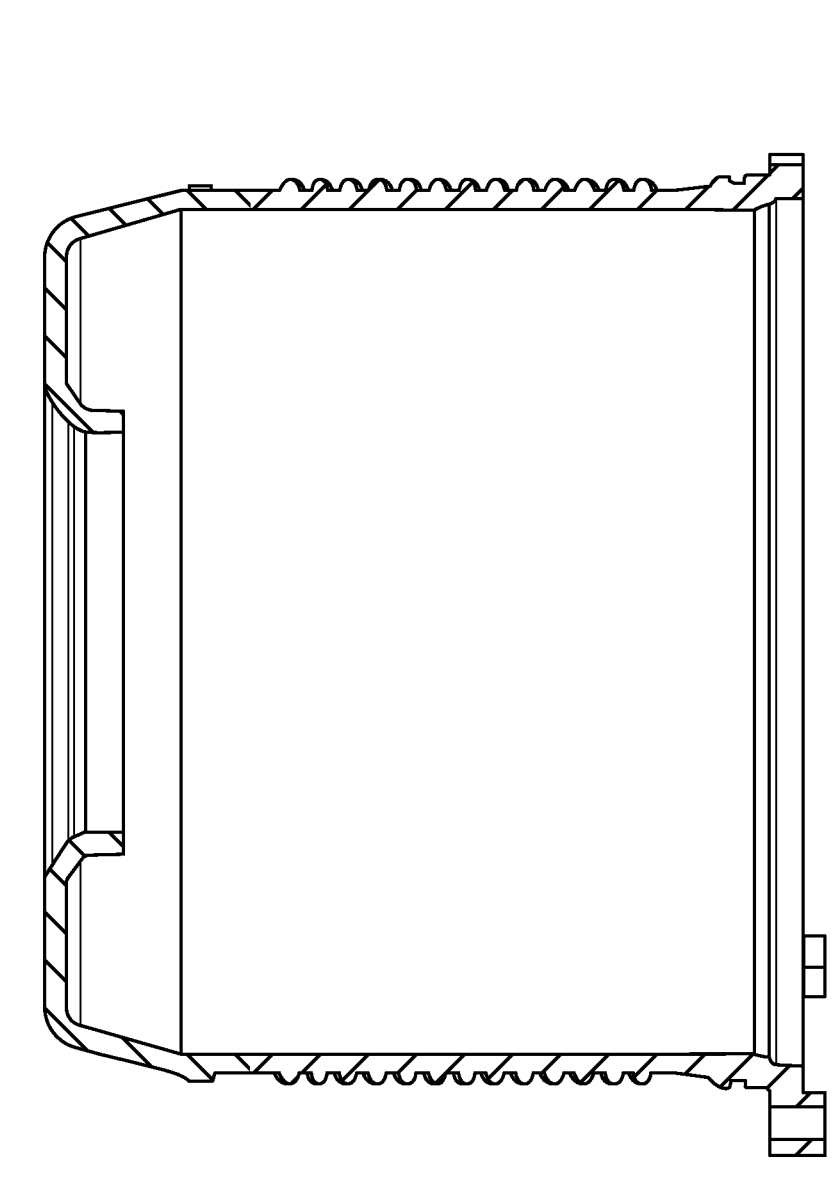
FIG. 4 is a cross-sectional view of the exemplary stator carrier of FIG. 3 after an optional machining process.

FIG. 4 illustrates the stator carrier 50 after machining smooth the surfaces of the stator carrier 50.

In the exemplary embodiment, the first end component 54 has a cylindrical section 86 including the first axial end face 68, a frustoconical section 90 extending from the cylindrical section 86, and a second axial end face 94 extending from the frustoconical section 90. The second axial end face 94 of the first end component 54 has a larger radial extent than the first axial end face 68 of the first end component 54.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 method
12 process step
14 process step
16 process step
18 process step
20 process step
50 stator carrier
54 first end component

5

58 second end component
62 intermediate component
64 tubular body
68 axial end face of first end component
72 axial end face of second end component
76 axial end face of intermediate component
78 axial end face of intermediate component
82 weld or weld region
86 cylindrical section
90 frustoconical section
94 second axial end face of the first end component

What is claimed is:

1. A method of making a stator carrier for an electric motor, the method comprising:
   forming a first end component;
   forming a second end component;
   forming an intermediate component;
   joining axial end faces of the first and second components to respective opposite axial end faces of the intermediate component;
   wherein the first and second end components are formed in a stamping process; and
   wherein forming the intermediate component includes machining the intermediate component from a tubular blank.

2. The method according to claim 1, wherein joining the axial end faces of the first and second end components to respective opposite axial end faces of the intermediate component includes joining with welding process.

3. The method according to claim 2, wherein the welding process includes at least one of friction welding or laser welding.

4. The method according to claim 1, wherein the first end component, the second end component and the intermediate component are tubular, and wherein the axial end faces of the first and second end components and the opposite axial end faces of the intermediate component have a common circumference.

5. The method according to claim 1, wherein a wall thickness of at least one of the first end component or the second end component is less than 12 mm.

6. The method according to claim 1, wherein joining axial end faces of the first and second end components to respective opposite axial end faces of the intermediate component is carried out simultaneously.

7. The method according to claim 1, further comprising machining an interior or exterior of the stator carrier after joining the axial end faces of the first and second end components to respective opposite axial end faces of the intermediate component.

8. The method according to claim 1, wherein the first end component, the second end component, and the intermediate component are made of aluminum or an alloy of aluminum.

9. A stator carrier comprising:
   a first end component;
   a second end component; and
   an intermediate component machined from a tubular blank between the first end component and the second end component;
   wherein the first end component is a stamped component including a first axial end face;
   wherein the second end component is a stamped component including a second axial end face; and
   wherein the first end component and the second end component are joined to opposite axial ends of the intermediate component by welds.

10. The stator carrier according to claim 9, wherein the welds are friction welds.

11. The stator carrier according to claim 9, wherein the welds are laser welds.

12. The stator carrier according to claim 9, wherein the first end component has a cylindrical section including the first axial end face of the first end component, a frustoconical section extending from the cylindrical section, and a second axial end face extending from the frustoconical section, wherein the second axial end face of the first end component has a larger radial extent than the first axial end face of the first end component.

13. The stator carrier according to claim 12, wherein the intermediate component is cylindrical.

* * * * *